June 15, 1971 G. VEENSTRA 3,585,073
ELECTRIC FILM RESISTORS
Filed June 27, 1968
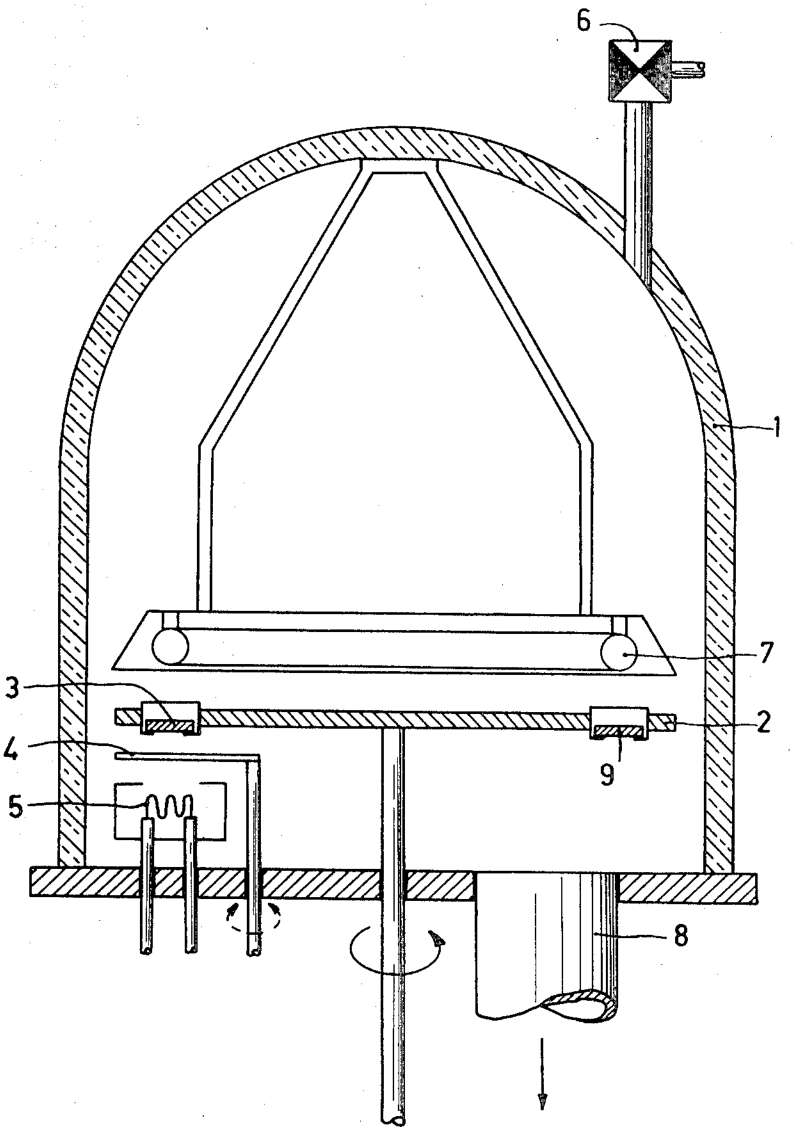
INVENTOR.
GUSTAAF VEENSTRA
BY
AGENT 3,585,073

ELECTRIC FILM RESISTORS

Gustaaf Veenstra, Nijmegen, Netherlands, assignor to U.S. Philips Corporation, New York, N.Y.
Filed June 27, 1968, Ser. No. 740,511
Claims priority, application Netherlands, July 6, 1967, 6709379
Int. Cl. H01b *1/08*
U.S. Cl. 117—201 6 Claims

ABSTRACT OF THE DISCLOSURE

A method of manufacturing a thin film resistor in which a number of metal layers are applied to an insulating material and each metal layer is completely oxidized before the succeeding layer is applied.

The invention relates to a method of manufacturing electric film resistors—briefly referred to hereinafter as film resistors—consisting of metal oxide, and to such resistors.

Various methods of manufacturing film resistors are known, in which the resistance layer is applied by vapour deposition or by sputtering to a substrate consisting of an insulating material. The developments in the field of the integrated circuits and more particularly in the field of hybrid circuits have resulted in a strong need of film resistors of very small dimensions having a high resistance per square, i.e. a high square resistance. These film resistors cannot be manufactured by the known methods. Conditions to be imposed on a method of manufacturing such film resistors having a high to a very high square resistance are that a high degree of reproducibility of the resistance value is attained and that film resistors can be obtained which, when exposed for a long time to higher temperature under oxidizing conditions, have a high stability.

The invention provides a method of manufacturing such film resistors having a high to a very high square resistance which satisfies the said conditions.

It is known to manufacture film resistors by a method in which a layer of metal, for example, of a Nichrome alloy, is applied by vapour deposition to a substrate consisting of an insulating material. In order to attain that such film resistors are less likely to change when exposed to the open air, they are "stabilized." This stabilization is effected by a superficial oxidation so that the metallic resistance layer proper is coated with a metal oxide layer. The square resistance of such a film resistor, the resistance body of which consists of a metal film, is comparatively low so that these resistors are not suitable for use in integrated circuits such as hybrid-monolithic and hybrid thin-film circuits.

The invention relates to a method by which very stable film resistors can be obtained which have a high to a very high square resistance and are particularly suitable for use in the said integrated circuits.

The invention relates to a method of manufacturing film resistors, in which a metal layer is applied to a substrate consisting of an electrically insulating material and is then exposed to an oxidizing atmosphere, and it is characterized in that several metal layers are applied in order of succession and in that each metal layer is oxidized separately and substantially completely.

A film resistor obtained by the method according to the invention consists wholly of a layer of metal oxide of homogeneous composition. This is of major importance for attaining high to very high square resistance values, for obtaining resistors of high stability and for reaching a satisfactory reproducibility.

The metal layer may be applied to a substrate in known manner, for example, by cathode sputtering. Advantageously, the layer is applied by vapour deposition in a vacuum. The thickness of the metal layer applied is always chosen so that during the oxidation, which may be effected by heating in oxygen or in an oxygen-containing gas, such as air, the metal is completely converted into metal oxide. Therefore, the metal layer should not be unduly thick. The square resistance of a single metal oxide layer thus obtained is so high that such a single completely oxidized layer is generally not used as a film resistor. A triple layer obtained in the manner described, i.e. a layer obtained by applying a metal layer from the vapour phase and then completely oxiding it, by applying from the vapour phase to the metal oxide layer thus obtained a second metal layer and then completely oxidizing it, and by applying from the vapour phase to the resulting metal oxide layer a third metal layer and then completely oxidizing it, has a square resistance which is still very high. Such a layer is very suitable for use as a film resistor, especially in integrated circuits, in which resistors having very small dimensions and high ohmic resistances should be used. The square resistance of such a triple layer is approximately 200KΩ at 20° C. The maximum thickness of the metal layer which can still be completely oxidized can be determined by experiments. This thickness depends upon a few factors, such as the metal or the alloy of metals of which the layer consists, the temperature at which the oxidation is carried out, the duration of the oxidizing process and the oxygen pressure of the gas in which the oxidation is carried out. In practice, the thickness of the layer to be oxidized is adapted to the embodiment of the method to be used and is chosen, for example, so that the oxidizing process does not require too much time when compared with the remaining steps of the process. The oxidizing process can be checked by means of a "monitor," as will be described in the embodiment below. When the oxidation is complete, this is apparent from the fact that, when the oxidizing process is continued, the electric resistance of the layer no longer increases. If the metal layer to be applied by vapour deposition in a vacuum consists of Nichrome, the thickness of the metal layer is chosen in a favourable embodiment to be such that the resistance of the substantially completely oxidized layer lies between 500KΩ and 1000KΩ per square.

Suitable metals for the layers to be applied and to be oxidized are, for example, chromium, tantalum and molybdenum. Alloys of nickel and chromium, such as Nichrome (80% and Ni, 20% of Cr), Chromel (90% of Ni, 10% of Cr) and Inconel (76% of Ni, 15% of Cr, 9% of Fe) are particularly suitable.

The layer applied may be oxidized by various known methods. When the metal layer is applied by vapour deposition in a vacuum, oxygen or air can be admitted into the evaporation-deposition space after the end of the vapour deposition. In practice, the oxygen-containing gas is admitted in dosed quantities. During the oxidation, the metal layer has substantially the same temperature as the substrate during the vapour deposition. The oxidation may also be carried out in a separate space although this is generally not recommendable for practical reasons. Oxidation may also take place already during the application of a metal by vapour deposition in that oxygen is admitted into the evaporation-deposition space. In this case, the oxygen pressure must not be high, for example, $10^{-5}$–$5.10^{-5}$ torr, because otherwise the oxidizing process may be disturbed by oxidation of the metal of the vapour source. At suitable oxygen pressure, the metal layer is generally only partly oxidized during the application by vapour deposition. In case oxidation takes place during the application by vapour deposition, the layer should be substantially completely oxidized in a separate operation. A partial oxidation during the application by vapour deposition affords the advantage that film resistors are obtained which have a very homogeneous composition. This becomes manifest especially in the manufacture of very thin film resistors having a very high square resistance, i.e. up to 500KΩ.

The number is layers to be applied to each other depends upon the desired square resistance value. This value decreases with an increase in the number of layers. The square resistance value of the layer ultimately obtained is determined by its thickness and not by the number of steps in which it is obtained. By the method according to the invention, film resistors have been manufactured which have strongly different square resistance values: these values lay between 1KΩ and 500KΩ.

Film resistors manufactured by the method according to the invention are particularly suitable for use in integrated circuits and especially in a hybrid-monolythic circuit, i.e. a circuit in which active elements of the circuit are incorporated in the semiconductor body and in which one or more resistors are applied in the form of a thin film to an insulating layer, for example, an oxide layer, on the semiconductor body, and further in a hybrid-thin-film circuit, i.e. a circuit in which inter alia resistors and capacitors are applied in the form of thin films to an insulating substrate (supporting body).

The method according to the invention will be described more fully with reference to the following example and the figure.

This figure shows a vacuum-bell jar 1 accommodating a rotor with a circular disc 2. The glass substrate 3 to be evaporation-deposited and also a monitor 9 are secured in apertures of the disk. The monitor 9 is a glass plate to which electrodes are applied by vapor deposition and by means of which the resistance of the metal layer applied by vapor deposition and of the oxide layer formed therefrom by oxidation is measured during the process. Since the layers applied to the substrates are invariably equal to those on the monitor, the electric square resistance of the layers applied to the substrates can always be measured during the process.

The vapor source 5 consisting of a meander-like Nichrome wire arranged in a box-shaped space open on one side for the metal to be applied by vapor desposition is disposed below the rotor disc. An infrared radiator 7 for heating the substrates and the monitor is arranged above the rotor disc (temperature approximately 350° C.).

After the bell jar 1 has been exhausted through the valve, the vapor source 5 is heated by passage of electric current. The rotor is set into rotation. Subsequently, a closure member 4 disposed above the vapor source is opened and the application by vapor deposition is started. After some time, it appears from the electric resistance measured on the monitor that a conducting layer has formed. When the monitor has reached a square resistance value of 200KΩ, the application by vapour deposition is interrupted by placing the closure member 4 in front of the vapour source. Air is then admitted into the bell jar through the valve 6 until a pressure of $6.10^{-4}$ torr has been attained. The metal layer applied by vapour deposition is now oxidized. After the oxidizing process, the square resistance of the monitor is measured. It is found that its square resistance increases. The oxidizing process is terminated when the resistance of the monitor no longer increases. The oxidation is then substantially complete.

The bell jar is exhausted again, a second metal layer is applied by vapour deposition and is then oxidized. After this step has been repeated, (triple) film resistors are obtained in three steps on the substrates and on the monitor, these resistors having a square resistance of approximately 200KΩ. It appears from a measurement at the film resistors on the various substrates that the square resistance of the separate film resistors is substantially the same. The differences are smaller than ±5%. The reproducibility of the method is therefore found to be excellent.

Due to the use of the monitor, film resistors having given pre-determined resistance values can be manufactured by this method.

Resistance layers of larger dimensions can be manufactured, from which film resistors of the desired dimensions can be obtained in known manner, for example, by etching. Alternatively, the desired film resistors may be directly arranged in the relevant circuits. The parts which must not be coated with a layer will then be covered or screened so that the layer formed thereon can be removed afterwards.

The film resistors have a high stability. In life tests, in which the resistors were kept for 100 hours in air of 175° C., the resistance value varied by less than 2%.

What is claimed is:

1. A method of manufacturing film resistors, comprising applying to a substrate consisting of an electrically insulating material a number of metal layers and oxidizing each of said metal layers in order of its application separately and substantially completely.

2. The method of claim 1 wherein at least one of the metal layers is partially oxidized during the application to the substrate.

3. The method of claim 1 wherein at least three metal layers are successfully applied which are each oxidized separately and substantially completely.

4. The method of claim 1 wherein the metal layers to be applied consist of a nickel-chromium alloy.

5. The method of claim 1 wherein the metal layers are applied by vapor deposition, and the oxidation takes place in the evaporation deposition space.

6. A film resistor obtained by the method of claim 1.

References Cited

UNITED STATES PATENTS 3,469,227 9/1969 Canegallo ---------- 117—217
3,472,691 10/1969 Kooy et al. --------- 117—217

WILLIAM L. JARVIS, Primary Examiner

U.S. Cl. X.R.

117—106; 148—6.3